United States Patent
Boodman et al.

(10) Patent No.: US 10,580,051 B2
(45) Date of Patent: Mar. 3, 2020

(54) BACKGROUND ELEMENT ASSOCIATED WITH AN APPLICATION INSTALLED IN A BROWSER APPLICATION

(75) Inventors: Aaron Boodman, San Francisco, CA (US); Erik Kay, Belmont, CA (US); Matthew Perry, Mountain View, CA (US); Rafael Weinstein, San Francisco, CA (US); Andrew T. Wilson, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 13/110,774

(22) Filed: May 18, 2011

(65) Prior Publication Data

US 2015/0207852 A1    Jul. 23, 2015

Related U.S. Application Data

(60) Provisional application No. 61/346,013, filed on May 18, 2010, provisional application No. 61/345,999, (Continued)

(51) Int. Cl.
*G06F 17/00* (2019.01)
*G06Q 30/06* (2012.01)
(Continued)

(52) U.S. Cl.
CPC ..... *G06Q 30/0609* (2013.01); *G06F 3/04842* (2013.01); *G06F 8/61* (2013.01); *G06F 9/54* (2013.01); *G06F 11/0766* (2013.01); *G06F 16/95* (2019.01); *G06F 16/958* (2019.01); *G06F 21/53* (2013.01); *G06F 21/57* (2013.01); *H04L 51/12* (2013.01); *H04L 63/0823* (2013.01); *H04L 63/1483* (2013.01); *H04L 67/10* (2013.01); *H04L 67/289* (2013.01);
(Continued)

(58) Field of Classification Search
CPC .................................................. G06F 17/30899
USPC .................................................. 715/234, 200
See application file for complete search history.

(56) References Cited

U.S. PATENT DOCUMENTS 6,269,456 B1 * 7/2001 Hodges ................. G06F 21/566
714/38.1
6,345,386 B1 * 2/2002 Delo ......................... G06F 8/61
717/176
(Continued)

FOREIGN PATENT DOCUMENTS

WO     2014025466 A1    2/2014

OTHER PUBLICATIONS

Adfm, Introducing the Web Workers API, Apr. 15, 2010, O'Reilly, pp. 1-4.*

(Continued)

*Primary Examiner* — Manglesh M Patel
(74) *Attorney, Agent, or Firm* — Brake Hughes Bellermann LLP

(57) ABSTRACT

A computer-implemented method includes running a background element that is an invisible element in a browser application, where the background element includes a declared association with an application and includes instructions related to one or more visible elements of the application in the browser application and executing the instructions on the background element to perform a function related to the one or more visible elements of the application in the browser application.

18 Claims, 12 Drawing Sheets

Related U.S. Application Data filed on May 18, 2010, provisional application No. 61/346,000, filed on May 18, 2010.

(51) Int. Cl.

| | | |
|---|---|---|
| *G06F 16/95* | (2019.01) | |
| *G06F 16/958* | (2019.01) | |
| *G06F 21/53* | (2013.01) | |
| *G06F 21/57* | (2013.01) | |
| *H04L 29/06* | (2006.01) | |
| *H04L 29/08* | (2006.01) | |
| *G06F 8/61* | (2018.01) | |
| *G06F 3/0484* | (2013.01) | |
| *H04L 12/58* | (2006.01) | |
| *G06F 9/54* | (2006.01) | |
| *G06F 11/07* | (2006.01) | |

(52) U.S. Cl.
CPC .......... *H04L 67/2842* (2013.01); *H04L 67/42* (2013.01); *H04L 67/02* (2013.01); *H04L 67/34* (2013.01)

(56) References Cited

U.S. PATENT DOCUMENTS

| | | | | |
|---|---|---|---|---|
| 6,553,490 | B1* | 4/2003 | Kottapurath | G06F 8/65 713/1 |
| 6,691,176 | B1* | 2/2004 | Narin et al. | 719/318 |
| 7,254,817 | B2* | 8/2007 | Kawahara | 719/328 |
| 7,308,648 | B1* | 12/2007 | Buchthal | G06F 17/30896 704/10 |
| 7,523,409 | B2* | 4/2009 | Yolleck et al. | 715/777 |
| 7,577,700 | B2 | 8/2009 | Tolson et al. | |
| 7,640,512 | B1 | 12/2009 | Appling | |
| 7,788,603 | B2 | 8/2010 | Lu et al. | |
| 8,136,109 | B1* | 3/2012 | Birdeau et al. | 717/175 |
| 8,140,646 | B2 | 3/2012 | Mickens et al. | |
| 8,176,321 | B1* | 5/2012 | Perry et al. | 713/167 |
| 8,250,228 | B1* | 8/2012 | Johansson | 709/231 |
| 8,296,357 | B2* | 10/2012 | Stone et al. | 709/203 |
| 8,347,021 | B1* | 1/2013 | Phillips et al. | 711/100 |
| 8,386,604 | B1* | 2/2013 | Kay et al. | 709/224 |
| 8,407,584 | B1* | 3/2013 | Boodman et al. | 715/234 |
| 8,528,003 | B2* | 9/2013 | Everett-Church | G06F 9/542 719/313 |
| 8,683,319 | B2* | 3/2014 | Yuan | G06F 17/30902 715/234 |
| 8,819,560 | B2* | 8/2014 | Ortwein | G06F 9/542 715/207 |
| 9,348,624 | B2* | 5/2016 | Aniszczyk | G06F 9/445 |
| 9,384,101 | B2* | 7/2016 | Calvo | G06F 9/545 |
| 9,390,172 | B2* | 7/2016 | Schleifer | G06F 9/541 |
| 9,417,759 | B1* | 8/2016 | Srinivasan | G06F 3/0481 |
| 2002/0065947 | A1* | 5/2002 | Wishoff | G06F 9/541 719/317 |
| 2003/0038837 | A1* | 2/2003 | Lopatin | 345/738 |
| 2004/0148608 | A1* | 7/2004 | Gendreau | G06F 9/45504 719/310 |
| 2005/0102611 | A1* | 5/2005 | Chen | 715/513 |
| 2006/0168101 | A1 | 7/2006 | Mikhailov et al. | |
| 2007/0118888 | A1* | 5/2007 | Styles | G06F 21/575 726/5 |
| 2007/0136579 | A1 | 6/2007 | Levy et al. | |
| 2008/0040681 | A1* | 2/2008 | Synstelien | G06F 9/4443 715/765 |
| 2008/0163088 | A1* | 7/2008 | Pradhan et al. | 715/764 |
| 2009/0271707 | A1* | 10/2009 | Lin et al. | 715/738 |
| 2010/0122271 | A1* | 5/2010 | Labour et al. | 719/328 |
| 2011/0082984 | A1* | 4/2011 | Yuan | 711/147 |
| 2011/0282940 | A1* | 11/2011 | Zhang | G06F 9/5072 709/204 |
| 2011/0314389 | A1 | 12/2011 | Meredith et al. | |
| 2012/0042261 | A1 | 2/2012 | Phillips et al. | |
| 2012/0174121 | A1 | 7/2012 | Treat et al. | |
| 2012/0179808 | A1 | 7/2012 | Bergkvist et al. | |
| 2012/0204144 | A1 | 8/2012 | Fioritoni et al. | |
| 2013/0080930 | A1* | 3/2013 | Johansson | 715/760 |
| 2013/0145361 | A1* | 6/2013 | Kaegi | G06F 17/3089 717/176 |
| 2013/0286425 | A1 | 10/2013 | Nakamura et al. | |
| 2014/0047360 | A1 | 2/2014 | Kay et al. | |
| 2015/0205675 | A1* | 7/2015 | Bolohan | G06F 11/1438 714/15 |

OTHER PUBLICATIONS

Juliana Pena, How to Build a Chrome Extention, Part 4: Background Pages and Scheduling Requests, published Jan. 5, 2010, Julip.co, pp. 1-3 (pdf).*

Bobby Malik, Build a Logon Script to Automate Deployment, published Mar. 13, 2005, windowsitpro.com, pp. 1-4 (pdf).*

Brinknnann Martin, GoogleUpdate.exe, published Dec. 28, 2008, gHack Tech News, pp. 1-5 (pdf).*

"Event Pages", Google Chrome Extensions, developer.chrome.com/extensions/event_pages.html, 2012, 2 pages.

"Background: Extending Your App's Life", Installable Web Apps, Google Developers, https://developers.google.com/chrome/apps/docs/background, Mar. 28, 2012, 7 pages.

International Search Report and Written Opinion for International Application No. PCT/US2013/047547, dated Oct. 18, 2013, 11 pages.

C. Gerard Gallant, "An Introduction to HTML 5 Web Workers", retrieved from http://cggallant.blogspot.de/2010/08/introduction-to-html-5-web-workers.html, Aug. 2, 2010, 6 pages.

Wei (Marshall) Shi, et al, "Use Web Workers to Improve the Usability of Your Web Applications", retrieved from http://www.ibm.com/developerworks/library/wa-webworkers/wa-webworkers-pdf.pdf, Nov. 9, 2010, 12 pages.

Ian Hickson, "Web Workers", retrieved from http://www.w3.org/TR/2011/WD-workers-20110310/, Mar. 10, 2011, 32 pages.

Response to Final Office Action for U.S. Appl. No. 13/570,951, filed Jan. 15, 2015, 8 pages.

International Preliminary Report on Patentability received for PCT Patent Application No. PCT/US2013/047547, dated Feb. 19, 2015, 8 pages.

Final Office Action for U.S. Appl. No. 13/570,951, dated Nov. 6, 2014, 13 pages.

Non-Final Office Action for U.S. Appl. No. 13/570,951, dated Mar. 28, 2014, 11 pages.

Non Final Office Action for U.S. Appl. No. 13/570,951, dated Jul. 16, 2015, 15 pages.

* cited by examiner

```
// In manifest.json
{
    "name": "App Name",
    ...
    "permissions": ["background"],
    "background_page": "https://example.com/background.html";
    ...
}
```

FIG. 5
5500

```
// In the app's launch page:
if (window.chrome && window.chrome.app && window.chrome.app.isInstalled) {
    window.open("background.html", "bg", "background");
}
...
```

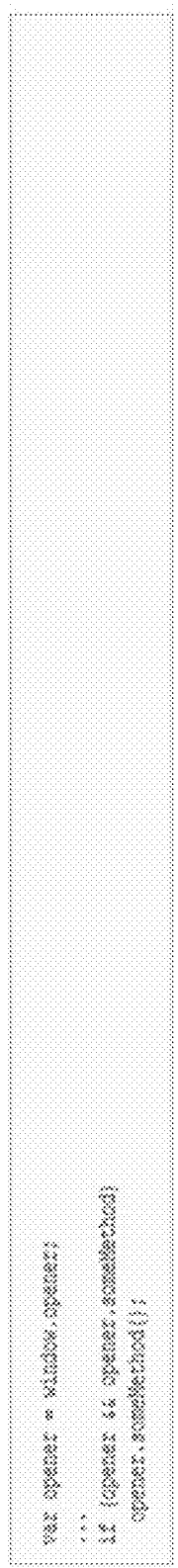

Start
↓

1510 Running a background element that is an invisible element in a browser application, where the background element includes a declared association with an application and includes instructions related to one or more visible elements of the application in the browser application

- 1512 The visible elements of the application are associated with a tab in the browser application and the background element is persistent upon closing the tab
- 1514 The background element is persistent upon closing the browser application
- 1516 The background element includes a background HTML page and/or a background window

↓

1520 Executing the instructions on the background element to perform a function related to the one or more visible elements of the application in the browser application

- 1522 Collecting information from one or more remote servers and updating state information associated with the visible elements of the application
- 1524 Collecting information from one or more remote servers, uploading state information associated with the application and displaying a notification including the information from the remote servers

↓

1530 Directly accessing the visible elements of the application from the background element using direct script access ↓
End

FIG. 15

BACKGROUND ELEMENT ASSOCIATED WITH AN APPLICATION INSTALLED IN A BROWSER APPLICATION

CROSS-REFERENCE TO RELATED APPLICATIONS

This application claims the benefit, under 35 U.S.C. § 119, of U.S. Provisional Patent Application No. 61/345,999 (titled "Installable Web Applications"), U.S. Provisional Patent Application No. 61/346,000 (titled "Web Store for Digital Goods"), and U.S. Provisional Patent Application No. 61/346,013 (titled, "Chrome Extensions"), all filed May 18, 2010. The disclosures of these provisional patent applications are incorporated herein by reference in their entirety.

TECHNICAL FIELD

This description relates to a background element associated with an application that is installed in a browser application.

BACKGROUND

Browsers typically enable users to interact with and experience many different types of content, usually over a computer network, and often in a visual or graphical manner. For example, users may install one or more internet browsers on a local computing device, and may thereafter utilize the internet browser to access content and/or functionality provided by a remote computing device.

SUMMARY

According to one general aspect, a computer-implemented method includes running a background element that is an invisible element in a browser application, where the background element includes a declared association with an application and includes instructions related to one or more visible elements of the application in the browser application and executing the instructions on the background element to perform a function related to the one or more visible elements of the application in the browser application.

In another general aspect, a computer-readable storage medium has recorded and stored thereon instructions that, when executed by a processor, cause the processor to perform a method, where the method includes running a background element that is an invisible element in a browser application, where the background element includes a declared association with an application and includes instructions related to one or more visible elements of the application in the browser application and executing the instructions on the background element to perform a function related to the one or more visible elements of the application in the browser application.

In another general aspect, an apparatus includes a memory that is arranged and configured to store executable code for a browser application and a processor that is operably coupled memory, where the processor is arranged and configured to execute the code for the browser application such that the browser application performs actions including running a background element that is an invisible element in a browser application, where the background element includes a declared association with an application and includes instructions related to one or more visible elements of the application in the browser application and executing the instructions on the background element to perform a function related to the one or more visible elements of the application in the browser application.

Implementations for each of the general aspects may include one or more of the following features. For example, the visible elements of the application may be associated with a tab in the browser application and the background element may be persistent upon closing the tab associated with the visible elements of the application. The background element may be persistent upon closing the browser application. The background element may include a background html page. The background element may include a background window. The visible elements of the application may be directly accessed from the background element using direct script access. Information from one or more remote servers may be collected and state information associated with the visible elements of the application may be updated. Information from one or more remote servers may be collected, state information associated with the application may be updated and a notification including the information from the remote servers may be displayed.

The details of one or more implementations are set forth in the accompanying drawings and the description below. Other features will be apparent from the description and drawings, and from the claims.

BRIEF DESCRIPTION OF THE DRAWINGS

FIG. 4 is an exemplary file containing an exemplary code snippet.

FIG. 5 is an exemplary file containing an exemplary code snippet.

FIG. 6 is an exemplary file containing an exemplary code snippet.

FIG. 7 is an exemplary file containing an exemplary code snippet.

FIG. 8 is an exemplary file containing an exemplary code snippet.

FIG. 11 is an exemplary file containing an exemplary code snippet.

FIG. 12 is an exemplary file containing an exemplary code snippet.

FIG. 13 is an exemplary file containing an exemplary code snippet.

FIG. 15 is a flowchart illustrating example operations of the system of FIG. 14.

DETAILED DESCRIPTION

Figure 1:
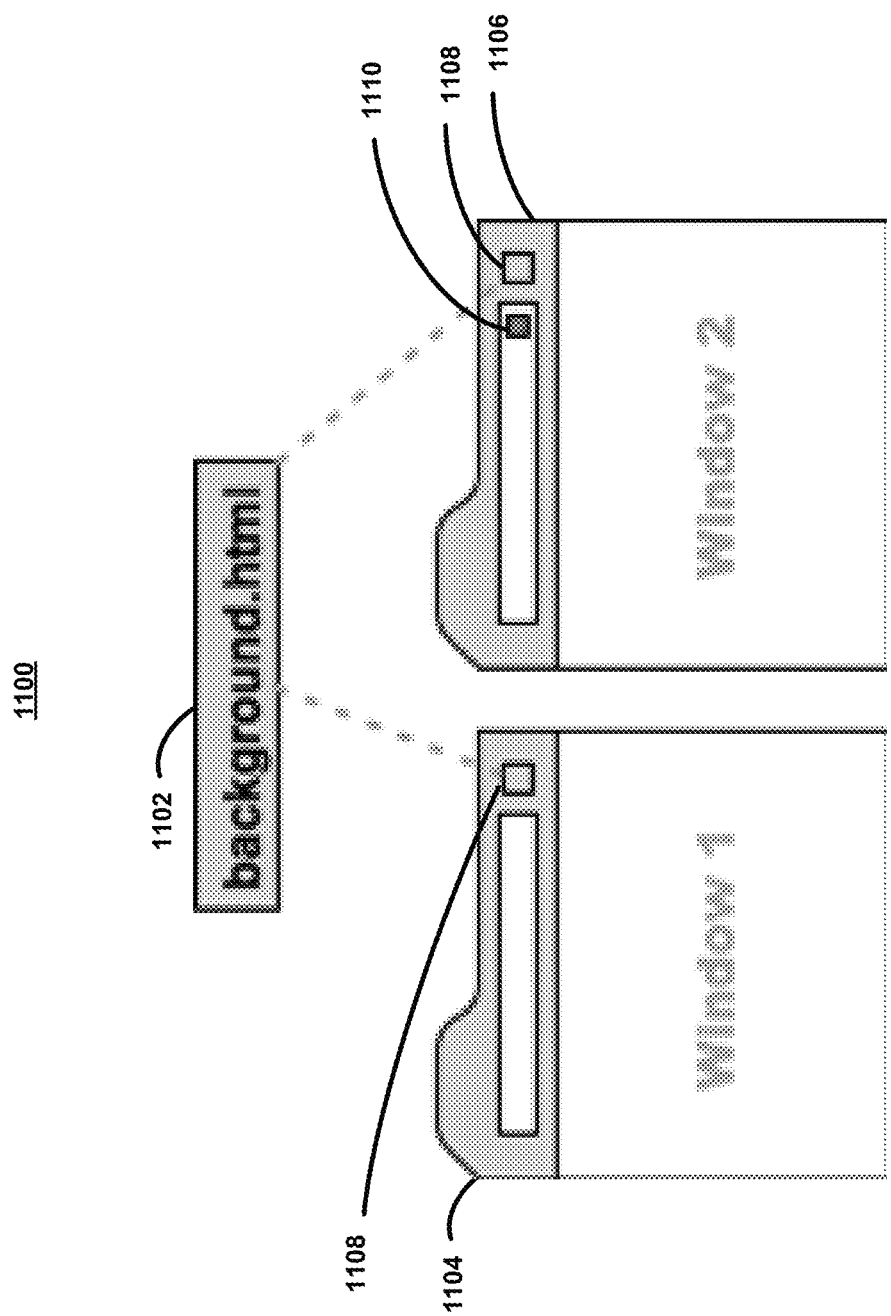
FIG. 1 is an exemplary schematic of web pages in a browser application.

This document describes systems and techniques that relate to a background element of an application that is installed in a browser application. The terms background element and background feature may be used interchangeably throughout this document to mean the same thing. The background element or background feature enables the application to run as soon as the user logs into their computer including before the user launches the browser application or an application associated with the background feature in the browser application. The background element is an invisible element in a browser application where the background element includes a declared association with an installed application in the browser application.

In one exemplary implementation, the background element continues to run and execute code even when the application and/or the browser application have no visible windows. In this manner, the background element is a persistent element even when the application and/or the browser application associated with the background element is closed.

Throughout this document, an application or an installed application may refer to a number of different types of applications that are installed in a browser application. Throughout this document, the terms browser and browser application may be used interchangeably to mean the same thing.

In one example, the application may refer to an extension application. Throughout this document, the terms extension application, web extension, web extension application, extension app and extension may be used interchangeably to refer to the same thing. An extension application may be a zipped bundle of files that adds functionality to a browser application. Extension applications may be webpages and may use all of the application programming interfaces (APIs) that the browser application provides to webpages. The extension application may include hypertext mark-up language (HTML), cascading style sheets (CSS), JavaScript, images, and other types of files and web-related computer languages and code.

In one exemplary implementation, the background element of an extension application is an invisible element that includes the main logic or instructions related to the extension application. In this manner, the background element may function as a central hub for the functionality of the extension application. The background element is associated with one or more visible elements of the extension application. Upon the launch or a triggering event such as logging into a computer or launching the browser application or launching the extension application, the background element launches and begins executing the instructions contained within the background element. In this manner, the extension application provides quick and fast access to content due to the fact that the background element is operating even when the visible elements of the extension are not being displayed. Upon invocation of a visible element of the extension, the background element provides content and information that has been collected in the background.

In another example, the application may be an installed web application. Throughout this document the terms web application and web app may be used interchangeably to refer to the same thing. A web application may be a normal website that includes extra metadata that is installed as part of a browser application. Installable web apps may use standard web technologies for server-side and client-side code. The extra metadata associated with the installable web application affects the web application's interaction with the browser application. The web application also may be associated with a background element that is an invisible element in the browser application that includes instructions related to one or more visible elements of the web application in the browser application. Upon the triggering of an event such as launching the browser application or opening the web application, the background element may execute the instructions on its page to perform functions related to the one or more visible elements of the installed web application.

Background elements may be used to include additional functionality related to the declared association with either the web application or the extension application or other types of applications installed in the browser application. For example, the background feature may be used to provide notifications, to download data from a server in the background, to upload data to a server, to prepare the user interface, to play audio, and to perform computations.

In one exemplary implementation, the application associated with the background element may declare its association as part of the extra metadata associated with the application. For example, the extra metadata may be defined in a file, which also may be referred to as a manifest or a manifest file. The background feature information may be included as part of the manifest file. In one example, specific permission may be declared in the manifest file such that the user is notified of the background element's existence prior to the installation of the application in the browser application. In this manner, the user is explicitly notified that an invisible background element exists and may be performing functions in the background even when no visible elements related to the installed application are being displayed. The installation of the application may be an implicit grant of permission by the user to use the background element in this manner. Should the user no longer desire to allow the background permission, the user may revoke the background permission by uninstalling the application from the browser application.

In one exemplary implementation, the background element may be a background webpage. The background webpage, as described above, is not a visible webpage but instead is an invisible webpage that provides functionality to one or more of the visible elements related to the application. In another exemplary implement, the background element may be a background window that is also an invisible window that includes instructions related to one or more of the visible elements of the application.

Referring to FIG. 1, a schematic 1100 illustrates an exemplary architecture of a background element as part of a browser application. In this example, the schematic 1100 illustrates a background element 1102, where the background element 1102 is a background.html page. The background element 1102 is an invisible element, in this example a webpage that is associated with multiple visible elements 1104 and 1106. The visible elements in this example include a first tabbed webpage 1104 and a second tabbed webpage 1106 that are visible in a browser application.

In this example, the browser application includes at least two extension applications that are installed. The first extension application may be referred to as a browser action 1108 and the second extension application may be referred to as a page action 1110. The browser action 1108 may be associated with each of the visible webpages 1104 and 1106. The browser action 1108 is associated with the background element 1102. The background element 1102 is defined by an html file (background.html) and includes JavaScript code that controls the behavior of the browser action 1108 in both of the windows 1104 and 1106. The background element 1102 may include instructions that enable the background element to access APIs that the extension applications 1108 may have been granted access to. In this manner, the background element 1102 may act as a control hub that includes the logic and instructions to run the extension application 1108.

Also, the background element 1102 may be allowed to have direct script access to one or all of the views of a page associated with the extension that is running at any given time. The background page may be enabled to access all of the views and to communicate with them synchronously. The background page 1102 may allow past shared state for all of the views running in the background page. In this manner, the background element 1102 includes cached logic. The other pages, whether visible or invisible, may get state information updated from the background element 1102.

In one exemplary implementation, the background element 1102 may be configured to perform as a central hub for receiving messages from content scripts or from other extensions. For example, the other pages associated with an extension application often need to communicate. Because all of an extension application's pages execute in the same process on the same thread, the pages can make direct function calls to each other. To find pages in the extension, chrome.extension methods and getViews( ) and getBackgroundPage( ) may be used. Once a page has a reference to other pages within the extension, the first page may invoke functions on the other pages, and it may manipulate their document object models (DOMs).

The extension application may use a content script to interact with other pages. For example, a content script may be a script (e.g., JavaScript) that executes in the context of a page that has been loaded into the browser application. Content scripts may read details of the web pages a browser application visits and the content scripts may make changes to the pages. For example, a content script may read and modify the DOM for a displayed web page. However, the content script may not be able to modify the DOM of its parent extension's background element. Also, a content script may exchange messages with its parent extension. For example, a content script might send a message whenever it finds a Really Simple Syndication (RSS) feed in a browser page. Also, for example, a background element 1102 may send a message asking a content script to change the appearance of its browser page. In these and other examples, the background element 1102 may function as a hub to receive messages from content scripts or from other extensions and to communicate the messages to an appropriate destination or to take action on the received message.

In one exemplary implementation, the background element 1102 may include a cache of all messages. For instance, in an email application, the extension may be related to the email application where the email application includes a visible window with an inbox. The inbox may populate and display quickly because the window itself is not retrieving information from a remote server. Instead, the invisible background element may pull the information from the remote server and provide the updated information directly to the visible window such that when the inbox window is selected either to open or to bring it into focus, the inbox window may be populated very quickly from the background page.

In another exemplary implementation, a web application such as a newspaper-related application may include a background page or background element associated with the newspaper application. The background element associated with the newspaper application may be persistent and continue to run even when the newspaper application is closed or not running. The background page may continue to gather and collect information from one or more remote servers such that when the newspaper application is made visible or brought into visible focus, the newspaper application may be updated more quickly by pulling the information from the background page instead of from the remote servers. In this manner, the persistent background element that runs in the background is used to update content in the background such that when a user desires to make the content visible it is easily and more quickly made accessible.

In one exemplary implementation, the browser application may run all top level pages from an installed application or extension application in the same process. In this manner, only one instance of critical systems related to the application is running at a time. Each tab in the browser application may use a separate process to protect the overall browser application from bugs and glitches in a rendering engine associated with the browser application. Access may be restricted from one rendering engine process to other rendering engine processes and to the rest of the system. In this manner, one process running for one application or for one extension is isolated and separate from other processes running for other applications or for other extensions.

Figure 2:
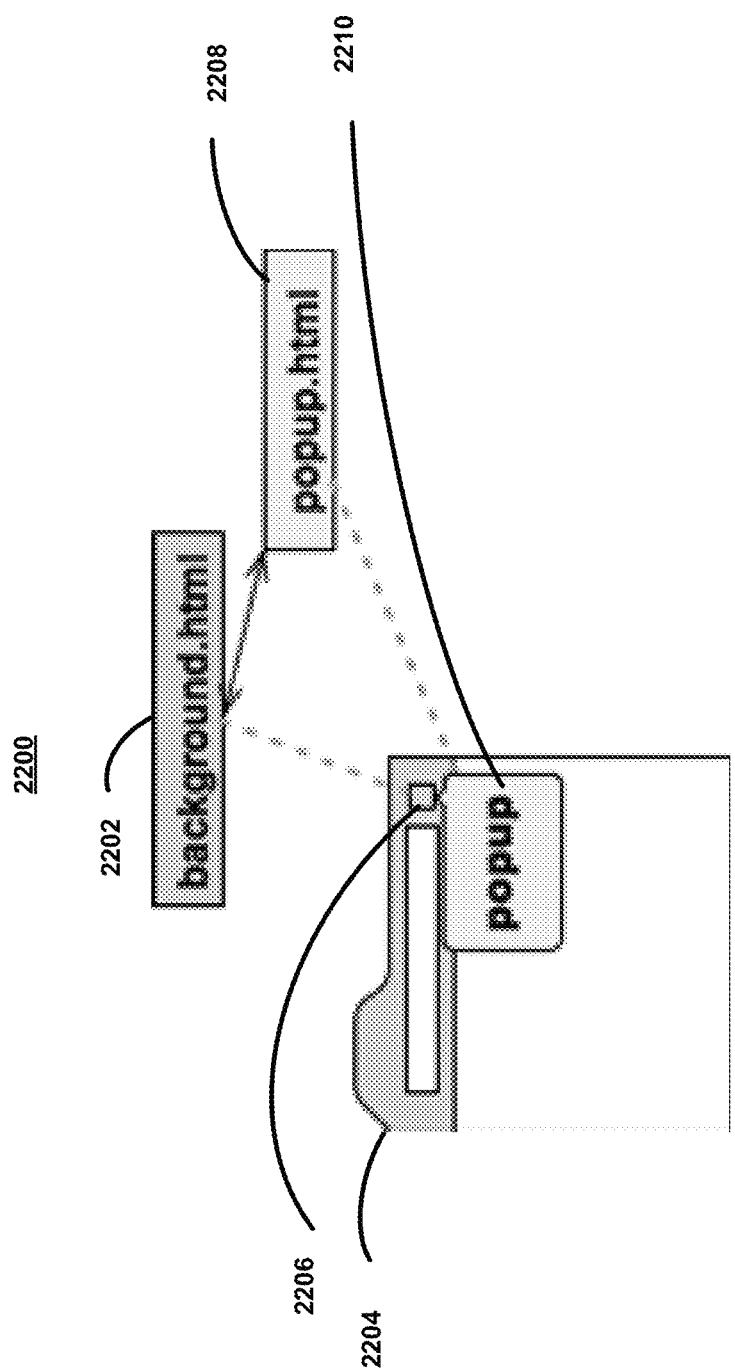
FIG. 2 is an exemplary schematic of a web page and a pop-up window in a browser application.

Referring to FIG. 2, an exemplary schematic 2200 illustrates a browser application. In the example schematic of the browser application 2200, a background element 2202 may be provided. The background element 2202 is invisible in the browser application such that a user may not view the contents or the instructions included in the background element 2202. Instead, the invisible background element 2202 is associated with a visible element 2204 of the browser application. In this example, the window 2204, which is a window in the browser application includes an extension application 2206 that is installed in the browser application.

In this example, the extension application 2206 is associated with both a background page 2202 and a popup page 2208. The popup page 2208 is implemented by an HTML file (e.g., popup.html). Also, for example, extension applications may use other means and implementations to display HTML files that are part of the extension application. For example, extensions also may use chrome.tabs.create( ) or window.open( ) to display HTML files that are in the extension. The HTML pages inside an extension may include complete access to each other's DOMs and those HTML pages may invoke functions on each other.

In this example, the architecture of the browser actions popup is illustrated. The contents of the popup window 2210 are a webpage defined by the popup element 2208, which is an HTML file called popup.html file. The popup doesn't need to duplicate code that's in the background page 2202 because the popup element 2208 may invoke functions on the background element 2202. Similarly, the background element 2202 may invoke functions on the popup element 2208. In this example, the popup window 2210 that is made visible in the browser application may be considered a dumb view. The dumb view does not update itself directly from the remote servers. Instead, when the view needs some state, it requests the state from the background element 2202. Also, when the background element 2202 notices a state change, the background element 2202 provide the state information to the popup window 2210 without first receiving a request.

Figure 3:
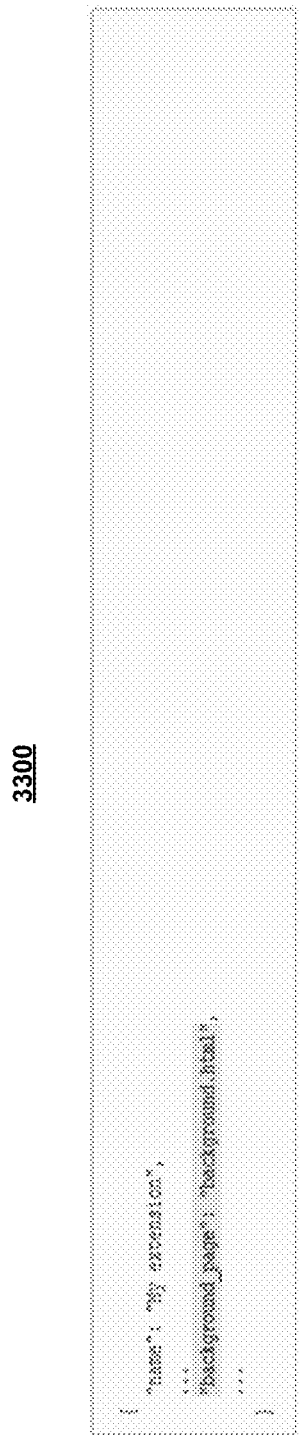
FIG. 3 is an exemplary file containing an exemplary code snippet.

As discussed above, a background element, whether it is a background page and/or a background window may be declared and registered as part of the application in the metadata that is associated with the application. For example, referring to FIG. 3, an example code snippet for a manifest file 3300 for an extension application is illustrated.

In this example, the manifest file 3300 explicitly declares that for the name of the extension application "my extension", the background page is "background.html". Although not shown in this example manifest file 3300, a permissions field may be included in the manifest file to explicitly declare the background permission to the user upon the installation of the web application or the extension application.

Figure 4:
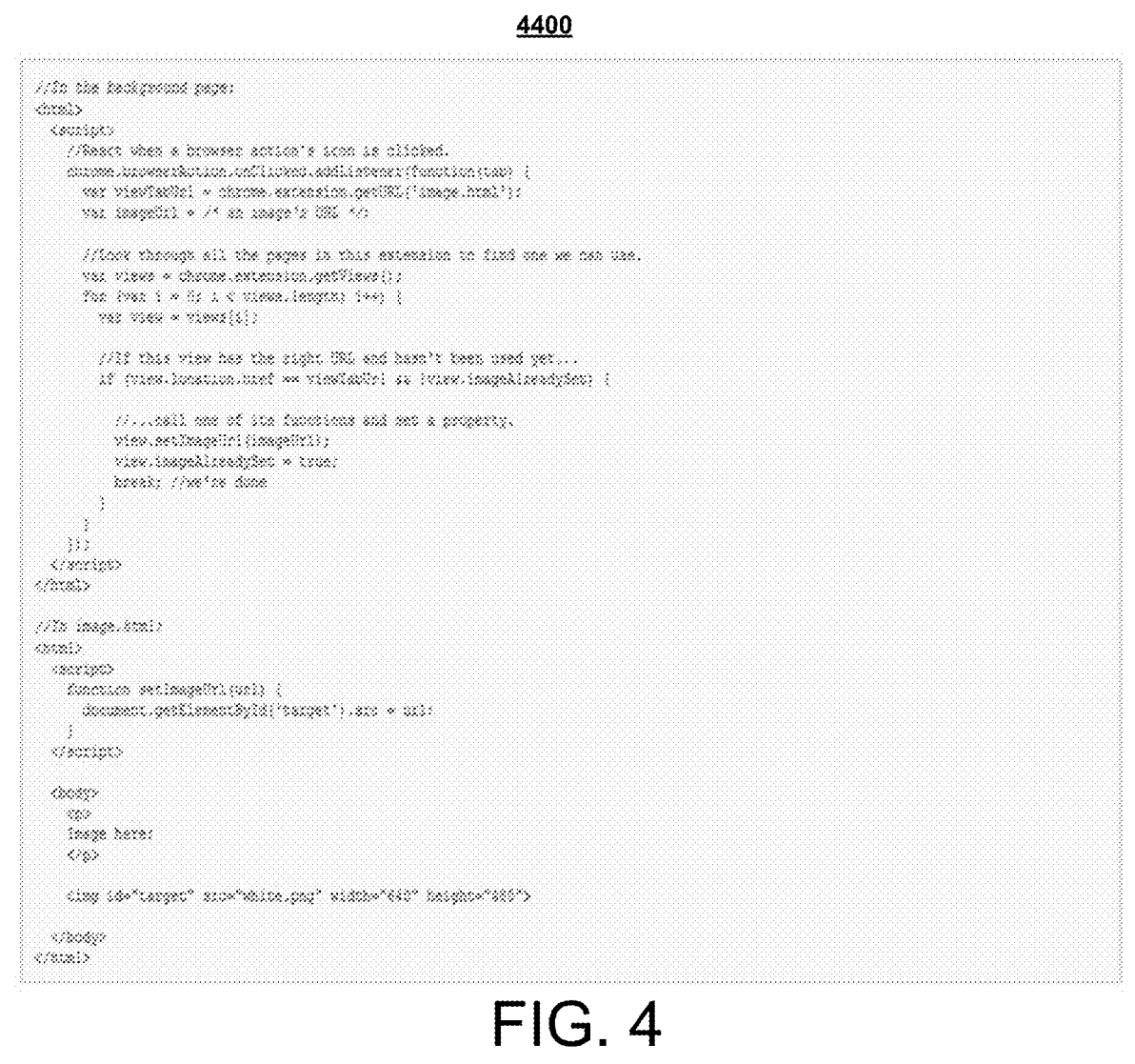

In one exemplary implementation, the various elements or pages associated with an application may communicate between each other using direct script calls. In this manner, the communication between the various pages is similar to how frames may communicate. Referring to FIG. 4, an example code snippet 4400 illustrates a method that returns a list of window objects for every active page belonging to an extension application and a method that returns the background page. The code snippet 4400 demonstrates how the background element may interact with other pages in the extension application. The code snippet 4400 also illustrates how the background page may be used to handle different events such as, for example, user clicks. The extension in this example has a background page and multiple pages created with chrome.tabs.create( ) from a file named image.html.

Referring to FIG. 5, an example code snippet of a manifest file 5500 illustrates the use of the background feature in an installed web application. As discussed above, the installed application explicitly declares the "background" permission in the manifest file 5500. Then, the associated application includes either a background page or a background window that contains the code or instructions that are needed to run in the background, where the background page or the background window are not visible to the user in the browser application or otherwise. In the manifest file 5500, the name of the application is "app name". The permissions field explicitly declares the "background" permission and the background page field declares the location of the background page, which in this example is "https://somePath/background.html#0."

Once the application that is to be installed includes a background permission, then a background element may be opened. In one exemplary implementation, a background element may be opened in different ways including using a background page or using a background window. In the example of FIG. 5, the manifest file 5500 uses a background page to open the background element. If a developer wants the background window to open as soon as the application is installed, even if the application is never launched, then the background page field may be an appropriate method to use. In this method, the background page field is declared in the manifest file such as shown 5500. By specifying a URL with "background_page" a background window opens every time the browser application launches and runs the contents of that URL. When the application is launched, it may close the background window or navigate the background window to a new URL.

In this example, the URL for the "background_page" value may be an HTTPS uniform resource locator (URL). If the URL is covered by the "URLs" field in the manifest file, then the background window may be in the same process as the application and may be called by the application. The fragment identifier ("#0") at the end of the URL may be optional. In other exemplary implementations, a non-HTTPS URL for "background_page" may be used by launching the browser application with a flag that designates a non-HTTPS URL designation.

Referring to FIG. 6, an exemplary file containing a code snippet 6600 is illustrated. In this example, the use of window.open( ) is illustrated to open a background element instead of using "background_page". The use of window.open( ) may let the developer control when the window opens, and may let the developer change which URL the window opens. After the application that is associated with the background element has launched for the first time, the developer may have the option of opening the background window whenever the browser application launches.

While the use of window.open( ) may give the developer more flexibility then "background_page", the developer may use the "background_page" if the background window is needed to be opened before the application has ever launched. Because the application explicitly invokes window.open( ) if the "background_page" is not used, then the application's background window can't be loaded until the application has run and used window.open( ) to open a background window.

FIG. 6 illustrates the technique to open a background window using the window.open( ) method that specifies "background" as the third argument. In this example, the call to window.open( ) creates a background window only if the application has "background" permission and the application doesn't already have a background window.

The background element may be used to include any type of code that a developer would like to use in the background element. For example, referring to FIG. 7, a code snippet 7700 illustrates one example of a background window code that brings up a notification. The code is included in a file named "background.html." Other types of code may be included in the background element. For example, below are some common use cases for the use of a background element in association with an application that includes one or more visible pages. The background element may be used for notifications. For example, a stock market application that desires to notify the user about changes in the price of a set of stocks may use a background element to provide that notification to the user.

In another example, a background element may be used to download data from one or more remote servers. For example, a book reader application may use a background element to download book information automatically in the background so that it always has the most recent data and that startup of the application is faster and improves the user experience because the information has been gathered previously by the background element.

In another example, a background element may be used to upload data to one or more remote servers. For example, a picture uploader that can send data to the server may use a background element to upload images even when the application's window is not visible to the user.

In another example, the background element may be used to prepare the user interface (UI). For example, an application that includes a complex user interface may use a background element to preload the user interface. Instead of creating or loading the user interface when the user explicitly launches the application, the background element preloads the user interface such that the complex user interface loads more quickly upon an explicit launch of the application because the information is being pulled directly from the background page instead of from other sources such as a remote server.

In another example, a background element may be used to play audio. For example, a radio application that offers the option of continuing to play music may use a background element to play even when the application's window is not open. The background element may include the code in the invisible page that is needed for the application to continue playing the audio music.

In another example, an application may use a background element to perform one or more computations. For example, an application that performs complex computations may use a background element to perform the complex computations either for its own work or in support of a distributed computing effort. Should a visible element associated with the application need access to results from the computations, the visible element may request the results from the background element that performed the complex computations. Also, the background element may provide the visible element with the results of the complex computations for display to the user in the browser application without first receiving a request from the visible element.

In one example implementation, when a user logs into the browser application or otherwise starts the browser application, any application including installed applications, hosted applications, packaged applications or extension applications that include the background permission, then the browser application may start up without displaying any windows. However, the invisible pages specified in the background elements may be started and the background code included on those pages may be executed. Each time the browser application starts up, it may open all URLs specified by "background_page" plus the application may reopen any other background windows that were open the last time the browser application shut down. The browser application may record the URL for each background element at the time that the background element is created. If the background element navigates to a new URL, that new URL may not be recorded. In one exemplary implementation, each application in the browser application may have one background window open at a time.

Figures 7, 8:
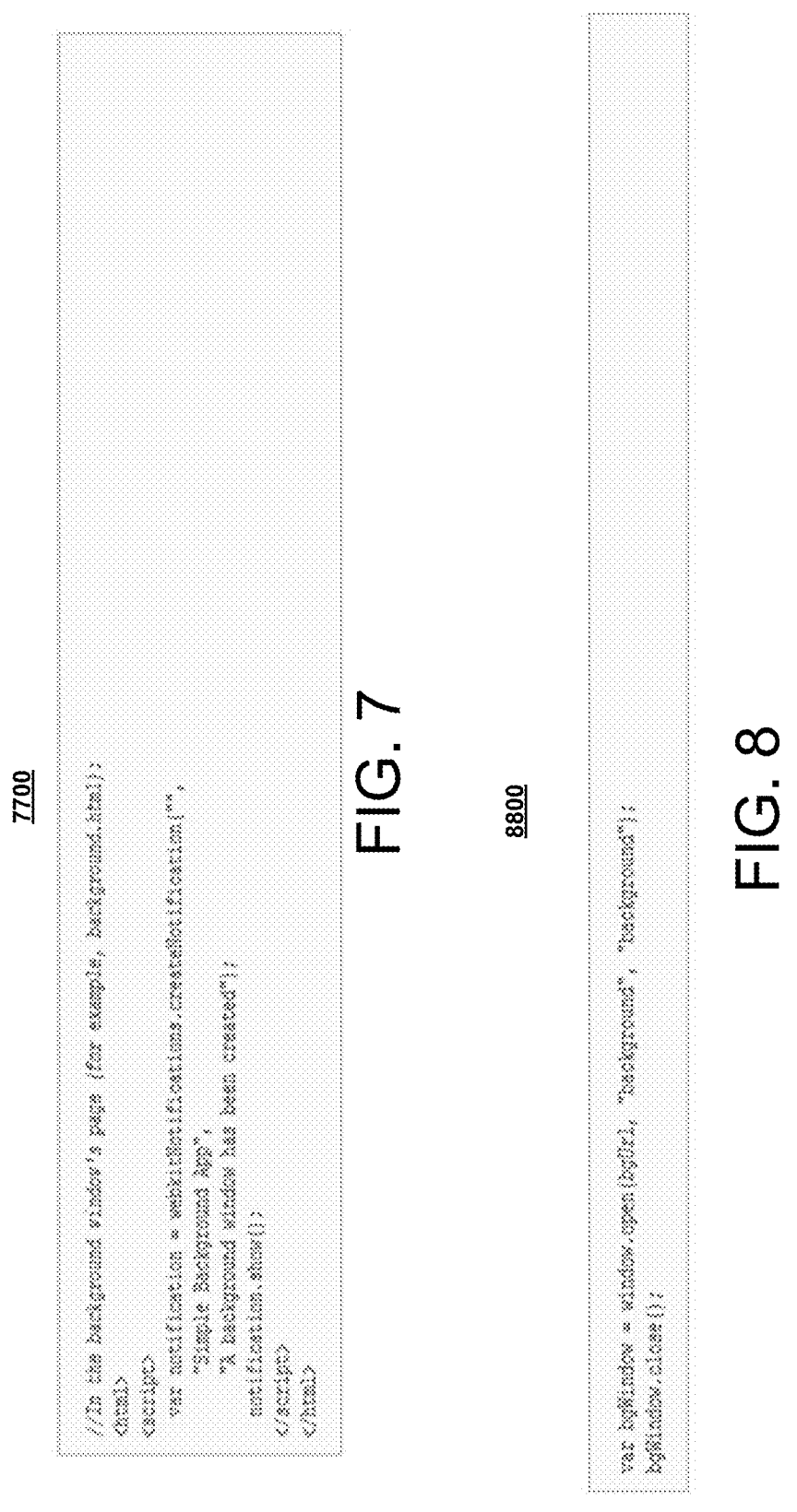

Referring to FIG. 8, an exemplary script 8800 is illustrated. In this example, the script 8800 illustrates how to close an open background window.

If an application does not have a background window opened, then calling window.open(bgUrl,BG_WIN_NAME, "background") opens a new background window and (unless the "background_page") is used, then the browser application records "bgUrl" as the URL to be used at startup when the browser application opens the application's background window. If the application does have a background window open, then calling window.open(bgUrl, BG_WIN_NAME, "background") with a new URL makes the existing background window navigate to the new URL, rather than opening a new window. In this case, the browser application may not record the new URL, and at startup the browser application may open the background window using its original URL.

Figure 9:
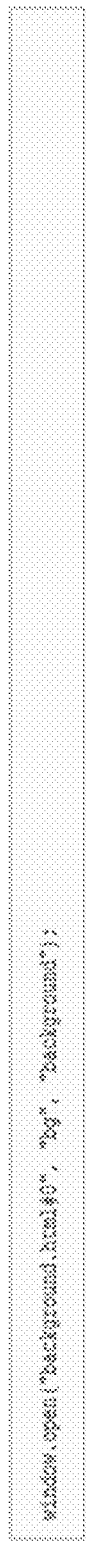
FIG. 9 is an exemplary file containing an exemplary code snippet.

Referring to FIG. 9, an example script 9900 is illustrated. In this example, to open a background window or switch to a new URL, the window.open(bgUrl,BG_WIN_NAME, "background") may be used. For example, as shown in the example script 9900, if the background window is implemented in a file named background.html, then the window.open( ) call may be as illustrated in the example. In one exemplary implementation, a fragment identifier such as "#0," in the URL may be used to improve performance when the background window is reopened. In this manner, the fragment identifier may be used to prevent a page reload if the window is already open. Otherwise, the window.open( ) causes a page reload if the window is already open unless a fragment identifier is present. The fragment identifier may work with any kind of window but may be useful with background windows because they may be long-lived and may build up state over time.

Background elements may be used to interface with other browser-related APIs. For example, one issue that may be encountered is that the browser application might not be able to get to the URL for the background window if there is no network connection available to the browser application. In this situation, the application cache API may be used to ensure that the background window can be loaded.

Figure 10:
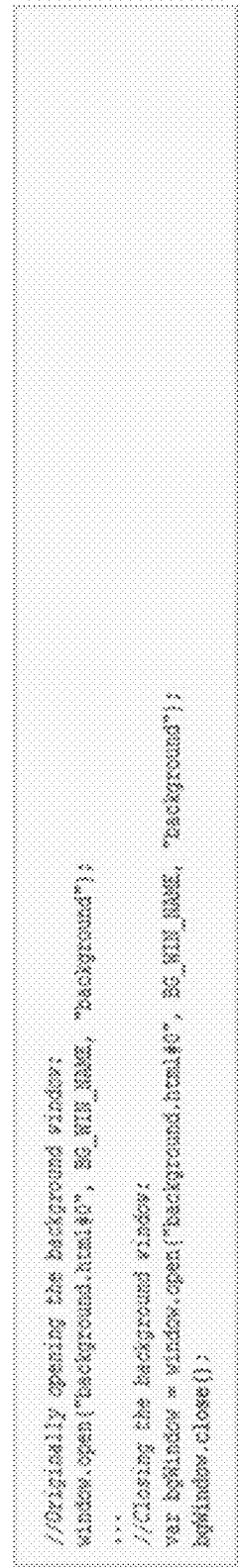
FIG. 10 is an exemplary file containing an exemplary code snippet.

Referring to FIG. 10, an exemplary script 10100 is illustrated. In this exemplary script 10100, a background window is closed using the close( ) method. In this example, the second call to window.open( ) includes the same arguments as the first call. If the background window is already open, the only affect of the second call to window.open( ) is to return a handle to the window. If the window is not open, it will be opened. In one exemplary implementation, if a background window is closed that was specified with "background_page", that background page will be open again the next time the browser application starts up. In another exemplary implementation, if it is desired to completely replace the existing background window, then the existing background window needs to be closed and then a new one needs to be opened. Unless the application's manifest file includes a "background_page", replacing the background window specifies a new "URL" when the browser application starts up.

Referring to FIG. 11, an exemplary script 11110 is illustrated. In this example script 11110, the exemplary code illustrates a method to call a method on the page that opened the background window if that page is available. For instance, it may not be desirable to call the opener from the background window. Often, the background window has no opener, because it is either launched by the browser application on startup or persists after the opener has closed. However, sometimes it may be desirable to call a method on the page that opened the background window, if that page is available. The exemplary script 11110 performs that function.

Referring to FIG. 12, an exemplary script 12120 is illustrated. Calls to window.open( ) may be returned before the background window is loaded, which might mean that the background window may not be immediately called after opening it. One way to be able to avoid calling the background window from the opener is by putting all the necessary code in the background window's handler for window.onload. If it is desired to call the background window as the result of user input, it may not be needed to wait for the background window to load. The application may not get user input until the user interface is available which may be well after the background window loads. The exemplary script 12120 provides an example of calling the background window from a button click handler.

Figure 13:
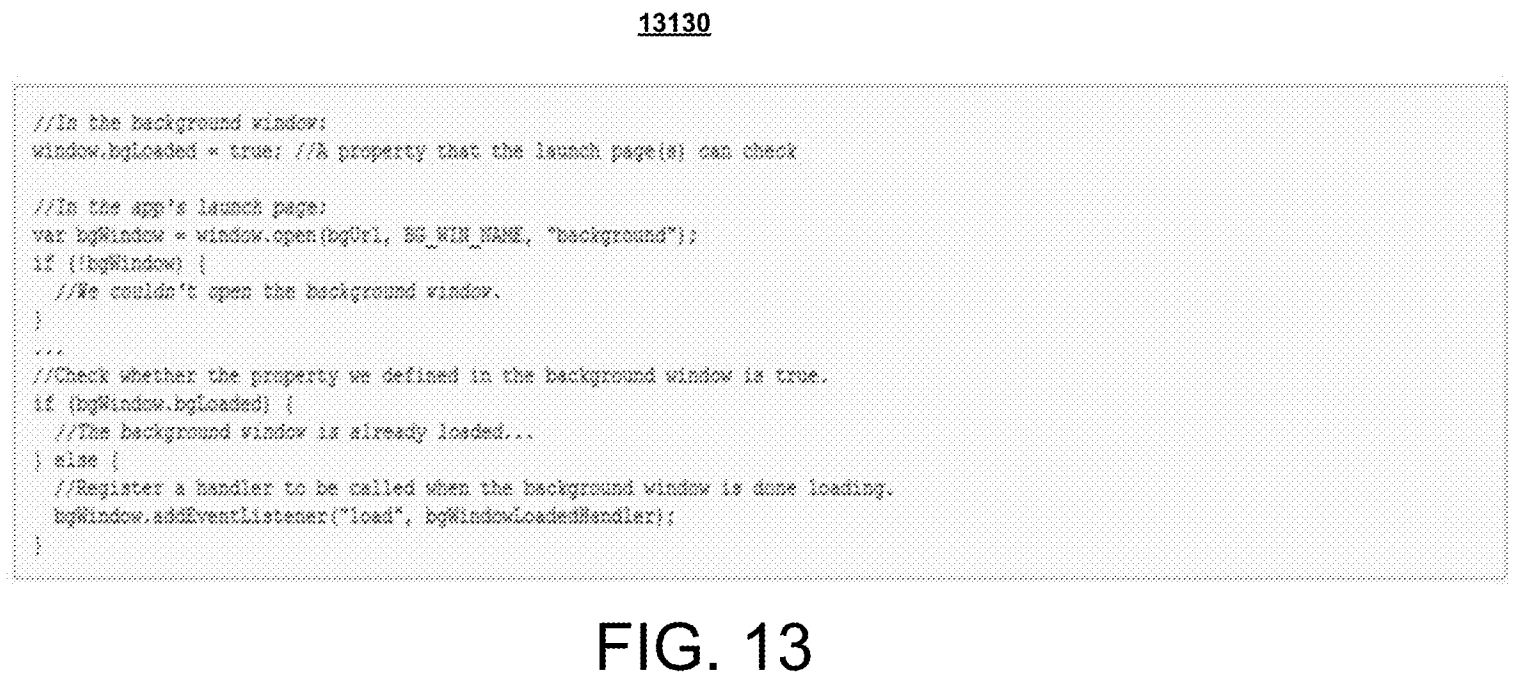

Referring to FIG. 13, an exemplary script 13130 illustrates a code snippet that may be used to ensure that the background window is open.

In one exemplary implementation, a task manager associated with an operating system may provide evidence that a background element is running. For example, the task manager may show any processes associated with background elements running, which are not visible to the user in any user interface such as the browser application. In this manner, the background element is considered to be persistent even if the tabs of the browser for a particular application have been closed or the browser application itself has been closed and is not visible to the user and not just merely minimized to a system tray. The browser application may be considered closed even if a process related to the browser application is still running as shown in a task manager window as associated with the operating system. Unlike a plug-in application that may be plugged into the browser application, a background element includes code and/or instructions that continues to run and is persistent even when the browser application has been closed. In a toolbar or other plug-in associated with the browser application, the plug-in ceases to operate as soon as the browser application and/or the tab associated with a particular application is closed.

Figure 14:
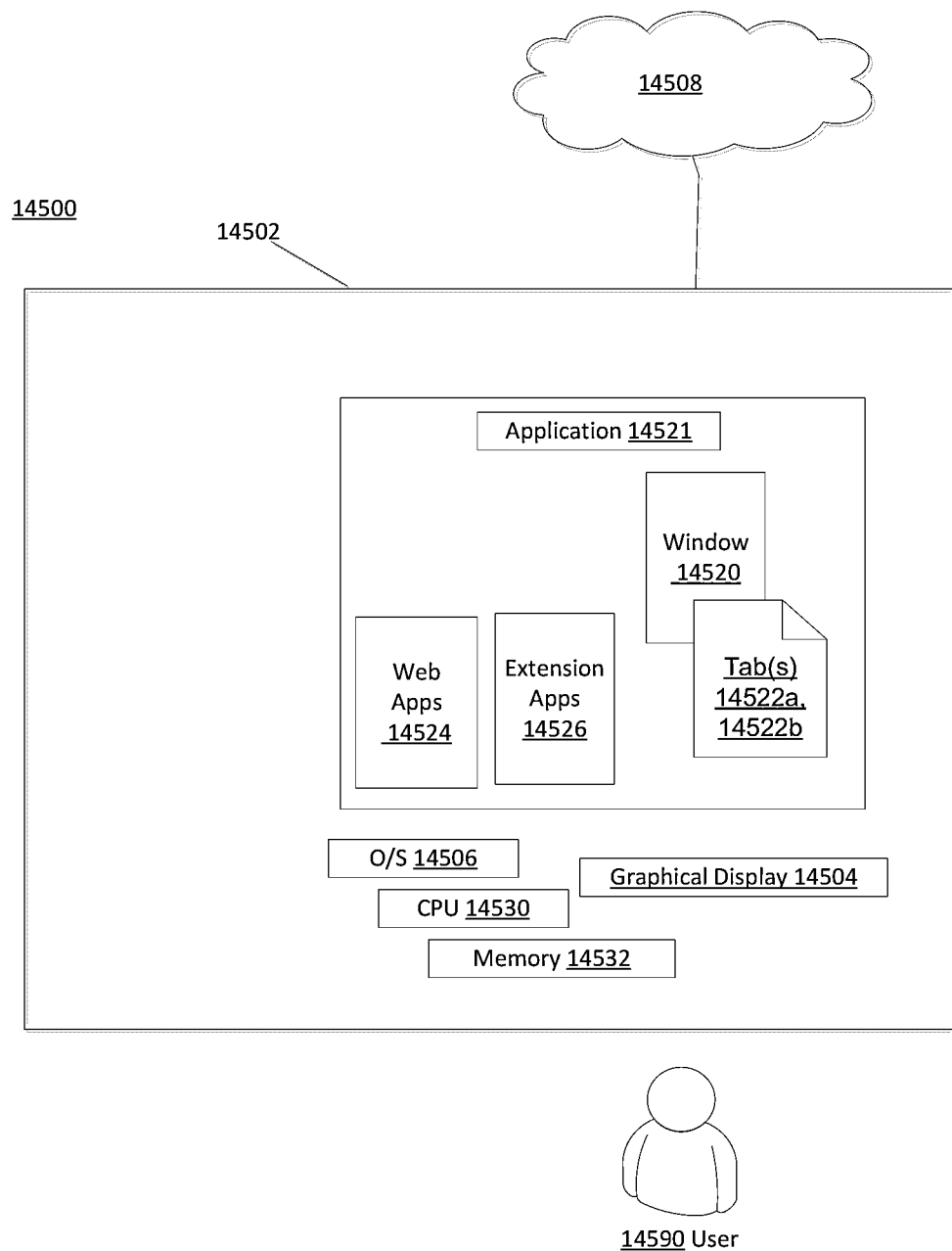
FIG. 14 is an exemplary block diagram of a system.

FIG. 14 is a block diagram of an example embodiment of a system 14500 in accordance with the disclosed subject matter. In various implementations, the system 14500 may include a client computer or other computing device (e.g., smart-phone, tablet computer, laptop, etc.) 14502 that executes an operating system 14506, and an application 14521 or window 14520. In one embodiment, the computer may include or be connected to a graphical display 14504 (e.g., a monitor, touch-screen, etc.) and receive input, at least in part, from a user 14590 interacting with the device 14502.

In one exemplary implementation, the device 14502 may be running or causing the operating system 14506 to execute the application 14521 or the window 14520. For purposes of illustration, the application 14521 may be a browser application that includes at least one window 14520. In various implementations, this window 14520 may include multiple panes or tabs 14522a, 14522b. The device 14502 may receive online content from one or more remote server computing devices (not shown) that may be connected to the client device 14502 though a network 14508 such as, for example, the Internet. The online content can be processed and displayed on the graphical display 14504 on a tab 14522a or 14522b in the browser application 14521.

As discussed above, the user 14590 may navigate to a web store on the Internet and download one or more web applications 14524 and/or extension applications 14526 to install in the browser application 14521. Prior to the installation of a web application 14524 or an extension application 14526, the browser application 14521 presents a notification that includes a request to confirm the installation of the application and that includes a listing of any permissions that are declared by the application. Upon receiving confirmation of the installation, the application is installed and the permissions are granted.

A memory 14532, or other non-transitory computer-readable storage medium, may store instructions and code that are executed by at least one processor 14530. The instructions may include any instructions or code related to the browser application 14521 and the process of installing applications in the browser application, including the notification and granting of permissions associated with the applications. The processor 14530 may execute any code or instructions provided on any background element associated with a web application and/or an extension application.

Referring to FIG. 15, an exemplary process 1500 is illustrated. The process 1500 may include running a background element that is an invisible element in a browser application, where the background element includes a declared association with an application and includes instructions related to one or more visible elements of the application in the browser application (1510). In this manner, and as discussed above with respect to the previous figures, the background element may be declared as associated with a particular application in a manifest file for the application.

The application may include one or more visible elements such as windows in a browser application, pop-up windows in the browser application, or other notification windows and visible elements associated with the browser application. The visible elements of the application may be associated with a tab in the browser application and the background element is persistent upon closing the tab (1512). In another exemplary implementation, the background element is persistent upon closing the browser application (1514). In this manner, the instructions and code contained in the background element continue to function and perform even after the browser application has been closed. The background element may include a background HTML page and/or a background window (1516).

The process 1500 also includes executing the instructions on the background element to perform a function related to the one or more visible elements of the application in the browser application (1520). For example, the invisible background element may begin executing the code contained on the background element upon a triggering event such as logging into a computing device or launching and/or logging into a browser application. The instructions are not visible to a user of the browser application. The instructions may include lots of different functionality such as those discussed above.

In one exemplary implementation, executing the instructions on the background element includes collecting information from one or more remote servers and updating state information associated with the invisible elements of the application (1522). In this manner, information may be collected in the background by the background element and the background element may provide the updated state information to a visible webpage either upon request by the visible element or after obtaining the updated information.

In another exemplary implementation, the background element may perform the function such as collecting information from one or more remote servers, uploading state information associated with the application and displaying a notification including the information from the remote servers (1524).

The process 1500 also may include directly accessing the visible elements of the application from the background element using direct script access (1530).

Figure 16:
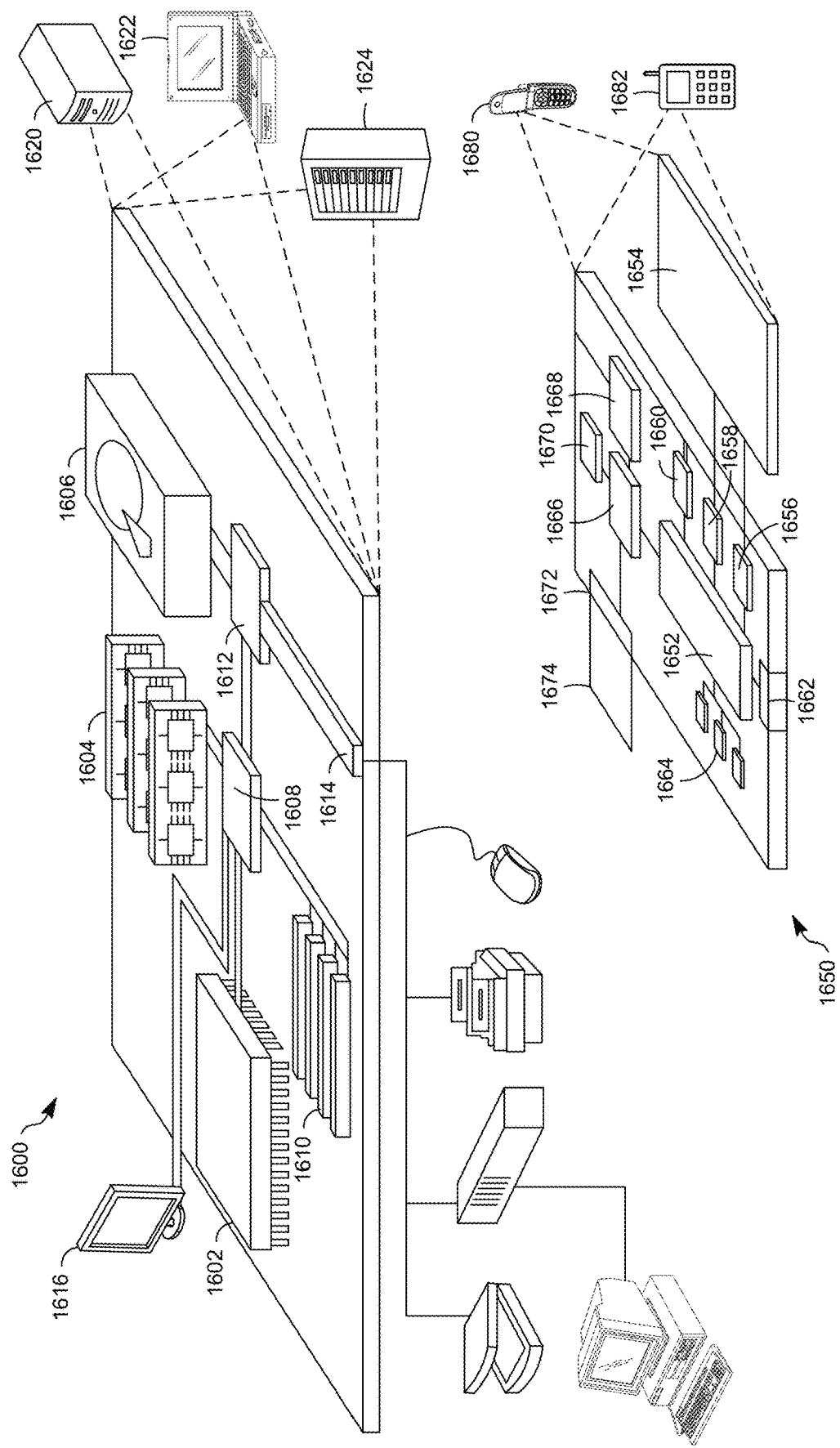
FIG. 16 is a block diagram showing example or representative computing devices and associated elements that may be used to implement the systems and methods of FIGS. 1-15.

FIG. 16 shows an example of a generic computer device 1600 and a generic mobile computer device 1650, which may be used with the techniques described here. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provide in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
running a background element that is an invisible element having a declared association with an installed application in a browser application and that starts running in response to a login of the computing device prior to and without launching the browser application, wherein the background element includes instructions related to one or more visible elements of the installed application in the browser application and the background element remains persistent when the installed application and the browser application are closed;
executing the instructions on the background element to perform a first function related to the one or more visible elements of the installed application in the browser application;
associating the background element with a popup element, the popup element defining a popup window and the popup element accessing a second function defined in the background element; and
updating the popup window using the second function defined in the background element.

2. The computer-implemented method of claim 1 wherein the visible elements of the installed application are associated with a tab in the browser application and the background element is persistent upon closing the tab associated with the visible elements of the installed application.

3. The computer-implemented method of claim 1 wherein the background element includes a background html page.

4. The computer-implemented method of claim 1 wherein the background element includes a background window.

5. The computer-implemented method of claim 1 further comprising directly accessing the visible elements of the installed application from the background element using direct script access.

6. The computer-implemented method of claim 1 wherein executing the instructions includes collecting information from one or more remote servers and updating state information associated with the visible elements of the installed application.

7. The computer-implemented method of claim 1 wherein executing the instructions includes collecting information from one or more remote servers, updating state information associated with the installed application and displaying a notification including the information from the remote servers.

8. A computer-readable storage device having recorded and stored thereon instructions that, when executed by a processor, cause the processor to perform a method, the method comprising:
running a background element that is an invisible element having a declared association with an installed application in a browser application and that starts running in response to a login of the computing device prior to and without launching the browser application, wherein the background element includes instructions related to one or more visible elements of the installed application in the browser application and the background element remains persistent when the installed application and the browser application are closed;
executing the instructions on the background element to perform a function related to the one or more visible elements of the installed application in the browser application;
associating the background element with a popup element, the popup element defining a popup window and the popup element accessing a second function defined in the background element; and
updating the popup window using the second function defined in the background element.

9. The computer-readable storage device of claim 8 wherein the visible elements of the installed application are associated with a tab in the browser application and the background element is persistent upon closing the tab associated with the visible elements of the installed application.

10. The computer-readable storage device of claim 8 wherein the background element includes a background html page.

11. The computer-readable storage device of claim 8 wherein the background element includes a background window.

12. The computer-readable storage device of claim 8 further comprising directly accessing the visible elements of the installed application from the background element using direct script access.

13. The computer-readable storage device of claim 8 wherein executing the instructions includes collecting information from one or more remote servers and updating state information associated with the visible elements of the installed application.

14. The computer-readable storage device of claim 8 wherein executing the instructions includes collecting information from one or more remote servers, updating state information associated with the installed application and displaying a notification including the information from the remote servers.

15. An apparatus comprising:
a memory that is arranged and configured to store executable code; and
a processor that is operably coupled memory, the processor being arranged and configured to execute the code to perform the actions of:
running a background element that is an invisible element having a declared association with an installed application in a browser application and that starts running in response to a login of the apparatus prior to and without launching the browser application, wherein the background element includes instructions related to one or more visible elements of the installed application in the browser application and the background element remains persistent when the installed application and the browser application are closed;
executing the instructions on the background element to perform a function related to the one or more visible elements of the installed application in the browser application;
associating the background element with a popup element, the popup element defining a popup window and the popup element accessing a second function defined in the background element; and
updating the popup window using the second function defined in the background element.

16. The apparatus of claim 15 wherein the visible elements of the installed application are associated with a tab in the browser application and the background element is persistent upon closing the tab associated with the visible elements of the installed application.

17. The apparatus of claim 15 wherein executing the instructions includes collecting information from one or more remote servers and updating state information associated with the visible elements of the installed application.

18. The apparatus of claim 15 wherein executing the instructions includes collecting information from one or more remote servers, updating state information associated with the installed application and displaying a notification including the information from the remote servers.

* * * * *